Aug. 31, 1965  G. C. PERRINE  3,203,269
TELESCOPING SCREW SEQUENCING DEVICE
Filed Oct. 22, 1962  4 Sheets-Sheet 1

INVENTOR.
GEORGE C. PERRINE
BY
George C. Sullivan
Agent

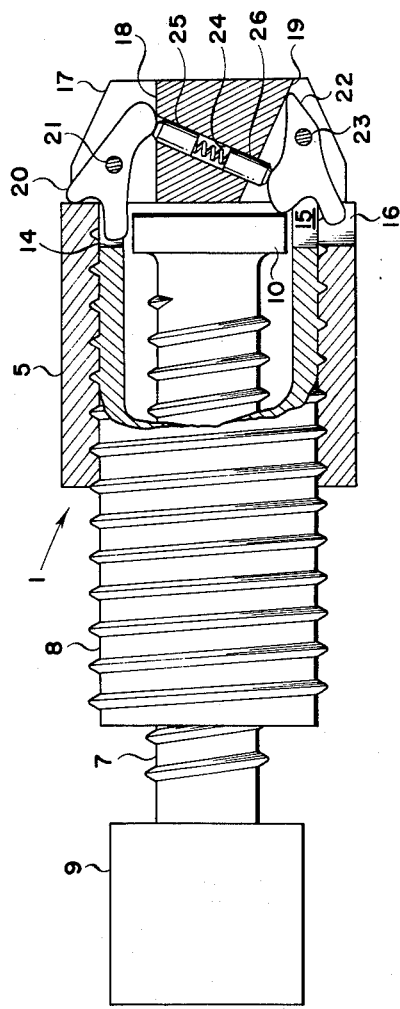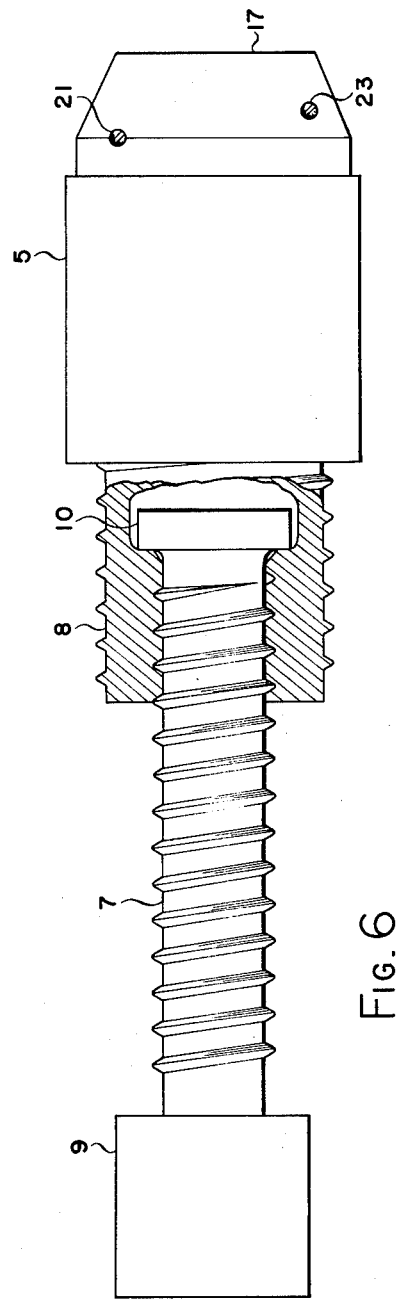

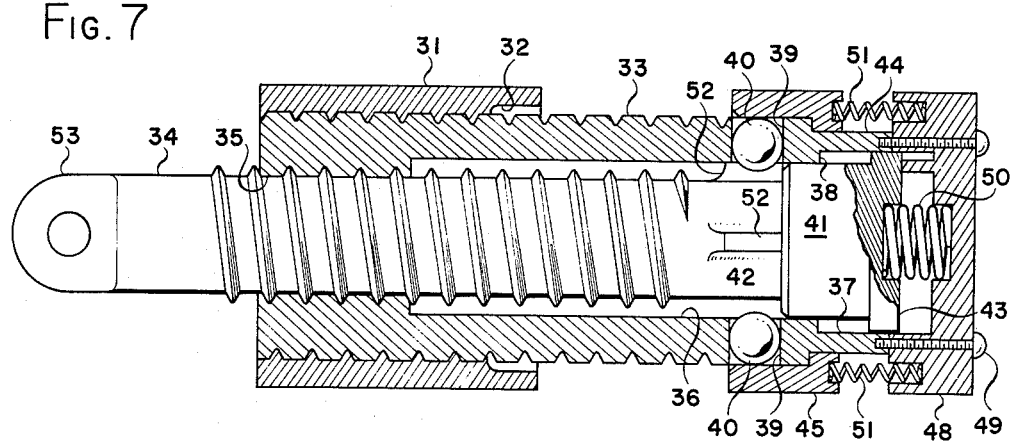
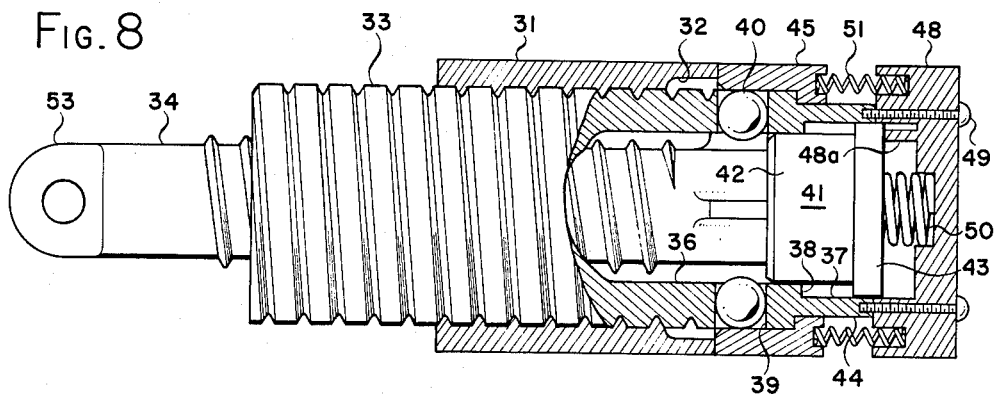
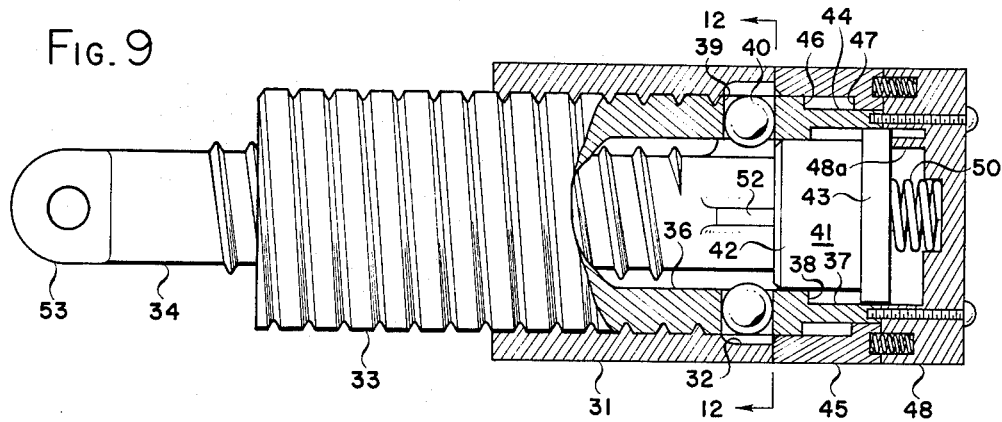

Aug. 31, 1965 G. C. PERRINE 3,203,269
TELESCOPING SCREW SEQUENCING DEVICE
Filed Oct. 22, 1962 4 Sheets-Sheet 4

INVENTOR.
GEORGE C. PERRINE
BY
*George C. Sullivan*
Agent

United States Patent Office 3,203,269
Patented Aug. 31, 1965

3,203,269
TELESCOPING SCREW SEQUENCING DEVICE
George C. Perrine, Burbank, Calif., assignor to Lockheed
Aircraft Corporation, Burbank, Calif.
Filed Oct. 22, 1962, Ser. No. 232,020
14 Claims. (Cl. 74—424.8)

This invention relates to telescoping screw actuating devices, and more particularly a telescoping screw device incorporating a positive acting sequencing mechanism for the telescoping screw portions for extension and retraction operation of the screw actuator.

While multi-sectional telescoping screw devices have been known in the prior art, the sequencing of operation of the individual sections has been that the sections can operate at random, or in other words, the operation of the sections is not necessarily assured in a predetermined order. Randomly operated sections of a telescoping screw require an amount of space or volume proximate the nut to avoid interference between the screw members and the supporting or surrounding structure to which the nut is connected. For instance, an example of the criticality of space availability for telescoping screw actuators can be found in the geometry of flap systems of winged aircraft where there is minimal space availability due to congestion presented by structure and other components and systems so that when the flaps are being extended, the outer screw must be actuated first or it will damage the flap. Likewise, when the flaps are being retracted, the outer screw must be actuated last or flap damage will also result. However, by incorporation of a positive sequencing control means such possibility of damage can be easily overcome by reducing the space requirements to a minimum.

Accordingly, it is an object of this invention to provide a telescoping screw actuator requiring a minimum of space for complete extension and retraction operations thereof, and thus permitting optimum design configurations for the available space or volume.

It is a further object of this invention to provide a telescoping screw actuator of multiple sections with a fixed sequence of operation of the sections, both when extending and retracting, thereby keeping the required space to a minimum.

Still a further object of this invention is to provide a telescoping screw actuator having a positive drive means to control the sequencing of the sections thereof without requiring additional power or complicated control systems.

A still further object of this invention is to provide a telescoping screw actuator with a predetermined program capable of different speeds of travel during extension and retraction, yet all with a constant speed motor.

And it is yet another object of this invention to provide a telescoping screw actuator which can combine extension and retraction during a single operation through control sequencing of the screw sections.

Other objects and advantages will become apparent from the following description taken in connection with the accompanying drawings in which:

FIGURES 3, 4 and 5 are partial cutaway views of the embodiment of the invention shown in FIGURE 2 in a partially extended position showing details of operation of the sequencing control;

FIGURE 6 is a view of the embodiment of the invention shown in FIGURE 2 in its most extended position;

Figure 10:
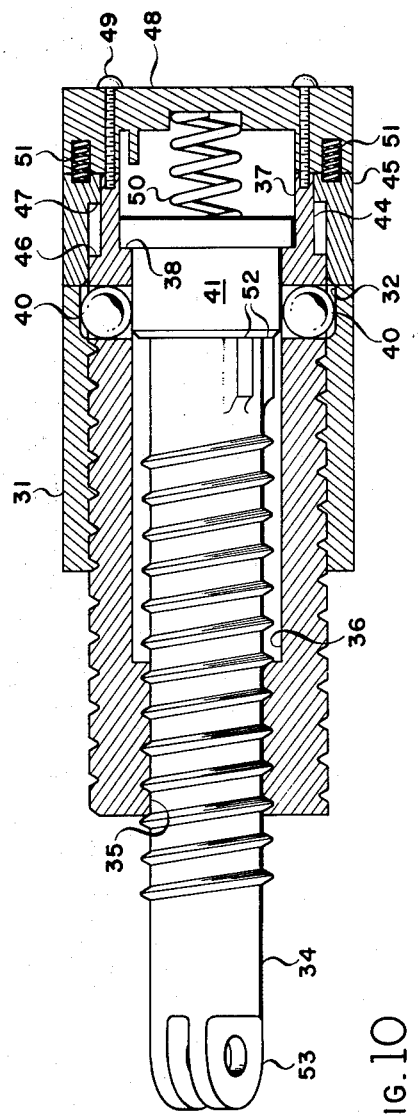
Figure 11:
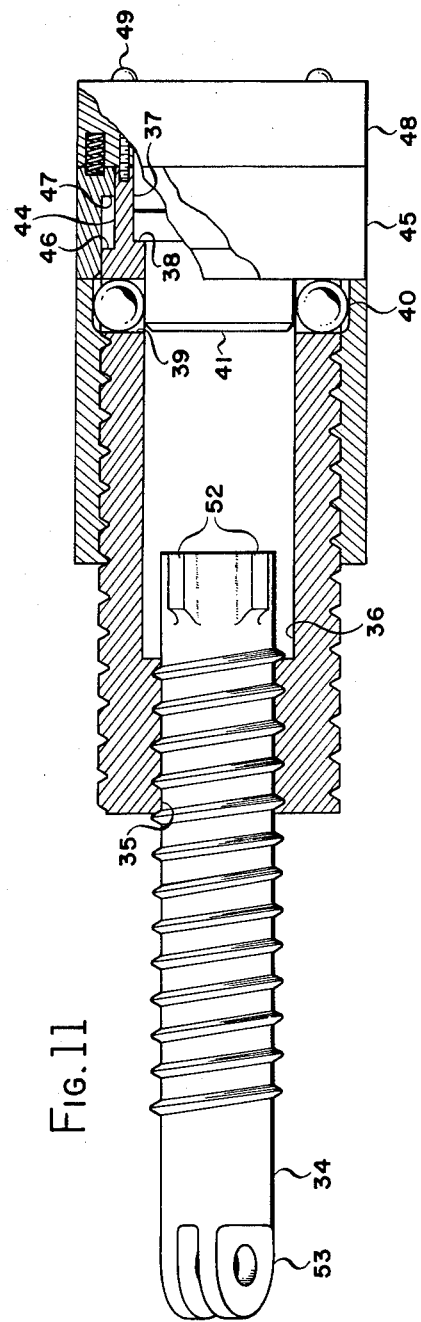
Figure 12:
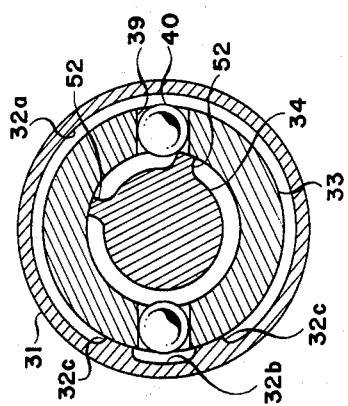

FIGURES 7 through 11 are similar to FIGURES 2 through 6 and depict another embodiment of this invention; and FIGURE 12 is a cross-sectional view taken along line 12—12 of FIGURE 10.

Generally stated, the invention comprises a screw actuator device consisting of a plurality of telescoping sections and incorporating a sequencing control arrangement wherein during one segment of operation, the inner and outer screw members are locked together so that the first relative longitudinal motion is between the screw nut and outer screw member section. Upon complete translation of the outer screw portion relative to the screw nut, the inner and outer screw members become unlocked and the outer screw member becomes locked with the screw nut so that continued operation would provide a relative motion between the inner screw member and the interlocked outer screw member and screw nut.

The sequencing control and locking arrangement is positively operated in such a manner that operation in the opposite direction is in an exact opposite manner whereby the first relative movement is between the inner screw member and the interlocked outer screw member and screw nut until there is complete translation therebetween, followed by the inner and outer screw portions becoming interlocked and the outer screw section and screw nut become unlocked so that upon continued operation, the relative motion or movement is by longitudinal travel of the interlocked inner and outer screw sections relative to the screw nut.

Figure 1:
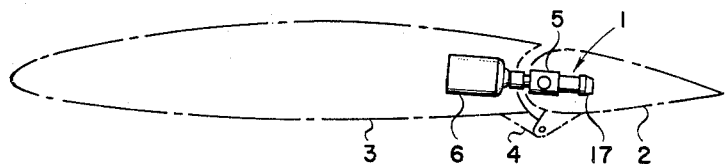
FIGURE 1 shows a schematic portrayal of the installation of a telescoping screw device of this invention.

More specifically, there is shown in FIGURE 1, one application of a telescoping screw assembly 1 installed to extend a flap 2 from an aerodynamic airfoil or wing 3 connected thereto through a linkage arrangement 4. Associated with the screw assembly 1 is a screw nut 5 which is pivotally secured to any appropriate structure (not shown) of the flap 2 and any appropriate drive motor 6 pivotally connected to internal structure (not shown) in wing 3, the motor 6 interconnected with the screw assembly 1 to rotate the screw sections relative to the screw nut 5 so that rotation of the screw section in one direction will advance the screw nut 5 away from the motor 6, thereby rotating flap 2 about the pivot axis of linkage arrangement 4. Both the screw nut 5 and motor 6 are pivotally mounted about axes normal to the longitudinal axis of the telescoping screw sections of assembly 1 to permit any desired travel path of flap 2 as desired and controlled by any variety of linkage arrangements which do not form any part of this invention.

Referring now more specifically to FIGURES 2 through 6, an inner screw section 7 is threadedly engaged in an outer screw section 8 in a telescoping manner to permit relative longitudinal travel between inner screw 7 and outer screw 8 by a relative rotation therebetween. Outer screw 8 is likewise threadedly engaged on the interior of screw nut 5 so that upon a relative rotation between outer screw 8 and nut 5 a relative longitudinal travel of nut 5 along outer screw 8 is accomplished by relative rotation therebetween. Inner screw section 7 is interconnected with the drive motor 6 of FIGURE 1 through any appropriate gear box or torque transmitting device identified in the drawings by the numeral 9 so that the turning power or torque for operation of the telescoping screw assembly 1 is transmitted by rotation of the inner screw section 7. Likewise, it is to be further understood that while threads are shown for the travel directing means between the inner and outer screw sections 7 and 8 respectively and the outer screw section 8 and screw nut 5, any appropriate travel directing arrangement having a helical pitch may be used, such as a ball screw actuator.

The end of inner screw section 7 opposite the end connected to the driving source is provided with a base or flange 10 having a radial slot or cutout 11, the purpose of which will be explained in more detail hereinafter.

Outer screw section 8 is threaded substantially along the entire length of its outer surface. A longitudinal passage extends through outer screw section 8 which is comprised of a first portion 12 that is threaded to mate with the threads on the outer portion of inner screw section 7 the, length of threaded engagement between inner screw 7 and outer screw 8 being less than the longitudinal length of outer screw section 8. The second portion of the through passage in outer screw member 8 consists of a chamber 13 formed by a bore of larger diameter than the threaded portion 12, the diameter of chamber 13 being slightly larger than the overall diameter of the base or flange 10 of inner screw section 7. The inner end portion of chamber 13 provides an annular seat for the side of the base or flange 10 of inner screw section 7 when the inner screw section 7 is in a position of maximum extension from outer screw section 8, this seating arrangement thereby forming a positive stop arrangement for the maximum extension of screw sections 7 and 8 as best seen in FIGURE 6.

The end of outer screw section 8 associated with the open end of chamber 13 is provided with a pair of diametrically opposed radial slots or cutouts 14 and 15, the purpose of which will be explained in more detail hereinafter. Likewise, there is also a radial slot or cutout 16 in the corresponding end of screw nut 5, the purpose of which will also be explained in greater detail later.

Attached to the end of outer screw section 8 containing the cutouts 14 and 15 is a base member 17 containing a pair of diametrically opposed radial slots or cutouts 18 and 19. A cam lock member 20 is pivotally mounted by a pin 21 in slot 18, while a second cam lock member 22 is pivotally mounted in cutout 19 by a pin 23. An angulated diametrical passage 24 extends through base 17 to provide passage communication between cutouts 18 and 19. Extending out of the opposite ends of passage 24 are pistons 25 and 26 which are biased or urged apart by a spring 27, the spring 27 bearing against piston 25 into engagement with cam lock 20 to urge cam lock 20 in a counterclockwise direction around pin 21 as viewed in FIGURES 2 and 5, and bearing against piston 26 into contact with cam lock 22 to urge cam lock 22 in a counterclockwise direction around pin 23 as best seen in FIGURES 2 and 5.

Figure 2:
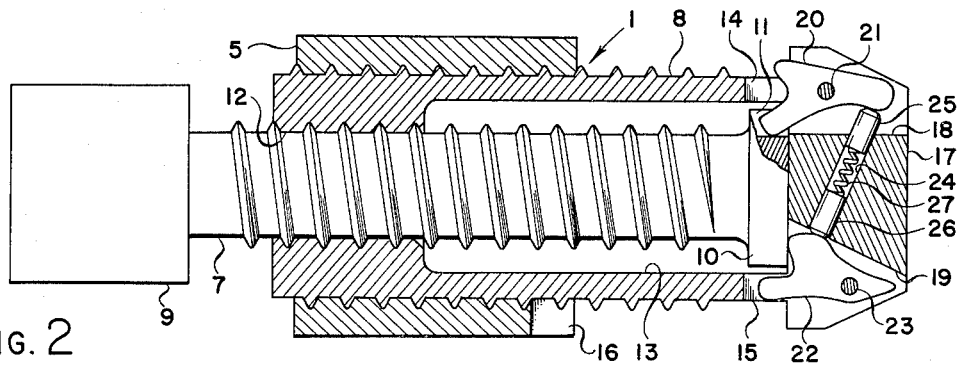
FIGURE 2 is a partial cutaway view showing details of one embodiment of this invention in its most retracted condition.
Figure 3:
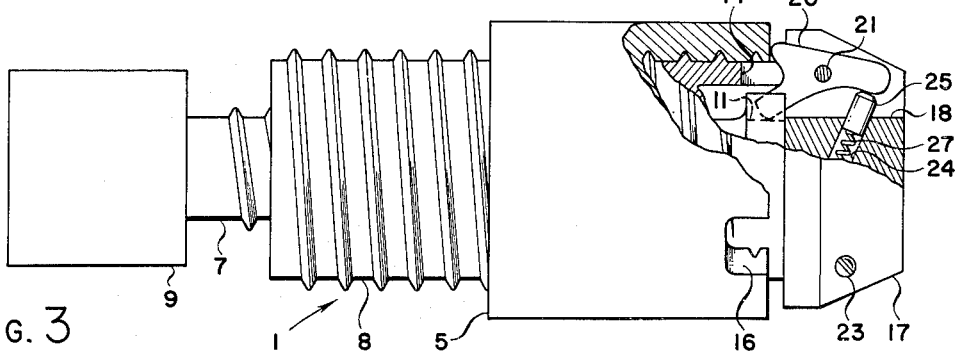
Figure 4:
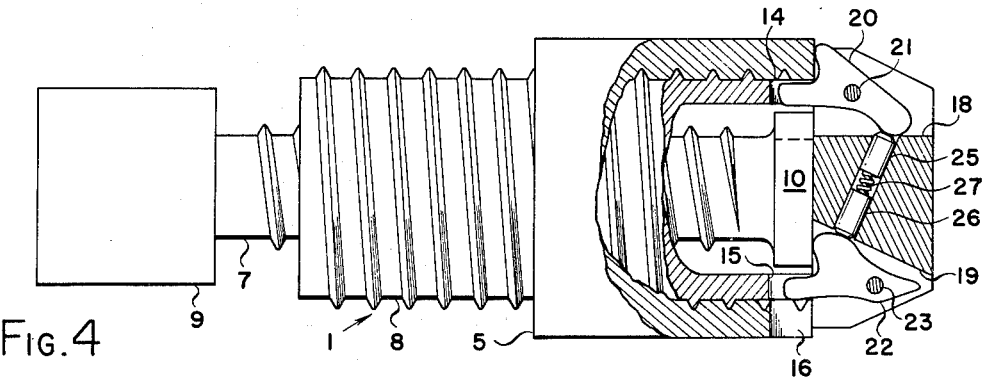

The operation of the telescoping of screw assembly 1 from its most retracted position as shown in FIGURE 2 to its most extended position as shown in FIGURE 6 is accomplished by rotation of inner screw section 7 through the fixed gear box or torque transmitting device 9. Such rotation of inner screw section 7 will likewise rotate outer screw section 8 as screw sections 7 and 8 are interconnected by the positive lock of one finger of cam lock 20 being held in slot 11 of base 10 of the inner screw section 7, cam lock 20 being held in this position by the compressive force of spring 27 reacting through piston 25 to maintain cam lock 20 in such position; it further being noted that the compressive force of spring 27 is prevented from moving cam lock 22 about pin 23 through piston 26 by virtue of the base 10 of inner screw section 7 restraining cam lock 22 from any counterclockwise rotation about pin 23 as best seen in FIGURE 2. Accordingly, the rotation of inner screw section 7 will also rotate outer screw section 8 and since screw nut 5 is held from physical rotation relative to screw sections 7 and 8, the screw nut 5 will move longitudinally down screw section 8 toward base 17. As screw nut 5 approaches base 17, the end of screw nut 5 will engage the projecting tip of cam lock 20 to cause cam lock 20 to rotate about pin 21 causing the portion or finger of cam lock 20 located in slot 11 in base 10 of the inner screw section 7 to move into slot 14 of outer screw section 8, this new position of cam lock 20 best seen in FIGURE 4. Since further advancement of screw nut 5 along outer screw section 8 is prohibited by the positive engagement of the confronting ends of screw nut 5 and base 17, continued rotation of inner screw section 7 will cause it to extend out of outer screw section 8 since the positive interlock between screw sections 7 and 8 by cam lock 20 was ceased upon the removal of cam lock 20 from slot 11 in the base 10 of inner screw section 7. Thus, as base 10 of inner screw section 7 moves away from base 17, the positive retention on cam lock 22 is removed and the portion of cam lock 22 located in slot 15 of outer screw section 8 moves into slot 16 of screw nut 5 so as to effect a positive interlocking arrangement between screw nut 5 and outer screw section 8 as can best be seen in FIGURE 5. Thereafter, continued rotation of inner screw section 7 in an extending direction will continue extension of screw section 7 from its telescoping relation to outer screw section 8, which by virtue of the positive lock with screw nut 5 will extend screw nut 5 longitudinally away from gear box 9 until the maximum extension is reached when base 10 of screw section 7 seats on the inner end wall of chamber 13 of screw section 8 as best seen in FIGURE 6.

Retraction of the screw assembly 1 is accomplished by a complete reversal of the extension operation just described in that rotation of inner screw section 7 in an opposite direction will cause movement of the interlocked screw nut 5 and outer screw section 8 from the position shown in FIGURE 6 toward the position shown in FIGURE 5 wherein the inner screw section 7 becomes telescoped within outer screw section 8. As base 10 of inner screw section 7 bottoms on base 17, screw nut 5 and outer screw section 8 become unlocked as cam lock 22 is moved from the position shown in FIGURE 5 to the position shown in FIGURE 4 and the continuing rotation of inner screw section 7 causes the inner and outer screw sections 7 and 8 to move concurrently to back screw nut 5 off of base 17 whereupon inner and outer screw sections 7 and 8 become positively interlocked by the movement of cam lock 20 from the position shown in FIGURE 4 to the position shown in FIGURE 3. In this manner there results a positive control of operation sequencing throughout the entire range of extension and/or retraction of telescoping screw assembly 1. Referring back to FIGURE 1, it can thus be seen that upon extension of flap 2 from wing 3, the first movement during extension is the movement of base 17 toward screw nut 5 which is fixed relative to flap 2 so that the distance of overhang of base 17 beyond the mounting pivot of screw nut 5 is at a minimum as flap 2 continues to extend from wing 3 and accordingly no damage is done to the upper surface of flap 2 due to any possible overhang of base 17 which could be the case if random operation were permitted. Likewise, during retraction of flap 2, there is provided in this arrangement that the movement of base 17 away from screw nut 5 is toward the end of the retracting path of flap 2 in that the movement of base 17 away from screw nut 5 cannot occur until inner screw section 7 is completely telescoped within outer screw section 8 and screw nut 5 is unlocked relative to outer screw section 8.

Referring now to FIGURES 7 through 12, there is shown another embodiment of this invention wherein the sequencing control of the telescoping screw assembly consists of a ball lock arrangement rather than a cam lock arrangement as explained hereinbefore. There is a screw nut 31 having a pair of grooves 32a and 32b at one end thereof by a pair of projecting lugs 32c (FIGURE 12), the screw nut 31 threadedly engaged with an outer screw section 33 having a central passage therethrough comprising a first threaded portion 35 and a second portion or chamber 36. An inner screw section 34 is threadedly engaged with the threaded portion 35 of outer screw section 33 in a telescoping arrangement, the inner screw section 34 having a yoke assembly 37 at one end thereof for connection to a rotating drive, it being understood that any appropriate drive interconnection may be used.

The inner surface of the open end of outer screw section 33 has an additional counterbore 37 of larger diameter than chamber 36, the counterbore 37 and chamber 36 intersecting to form an annular wall or seat 38. A pair of diametrically located wall passages or openings 39 are located in the chamber 36 portion of outer section 33 proximate the end wall 38, with a lock ball 40 located in each passage 39.

Located in the open end of outer screw section 33 is a piston or plug 41 having a small diameter portion 42 of a size to permit passage through chamber 36 and a large diameter portion 43 to allow passage in counterbore 37.

The outer periphery of the open end of outer screw section 33 has a cutout 44 to present the open end of outer screw section 33 with a reduced diameter. An annular slide ring 45 of an L-cross-section shape so as to provide both a large and small inner diameter is located circumferentially around outer screw section 33 so that the larger inner diameter portion of slide ring 45 will slide over the larger outer diameter of outer screw section 33 adjacent the free end thereof while the smaller inner diameter portion of slide ring 45 will slide on the smaller outer diameter portion of the open end of outer screw section 33 that is formed by cutout 44, the maximum extent of travel of slide ring 45 over outer screw section 33 toward screw nut 31 being limited by the coaction of annular seats 46 and 47; annular seat 46 formed in outer screw section 33 by cutout 44 and annular seat 47 formed on the inner side of slide ring 45 by the wall between the large and small inner diameters of slide ring 45, both of the annular seats 46 and 47 which are best seen in FIGURES 9 through 11.

An end cap 48 is mounted to the open end of outer screw section 33 by any appropriate fastening means such as bolts or screws 49. The piston or plug 41 is urged away from end cap 48 by a spring 50 whose ends are seated in retention cutouts in both of the confronting walls or surfaces of end cap 48 and piston 41. Likewise, slide ring 45 is biased away from end cap 48 by a plurality of springs 51 the ends of each of which are seated in relief cutouts in the confronting surfaces of both slide ring 45 and end cap 48. The purposes of springs 50 and 51 will be described in more detail hereinafter.

The inner end of inner screw section 34 has a pair of radially extending ears or lugs 52 which are separated circumferentially around the periphery of inner screw section 44 substantially nearer 90° than 180° apart, as can best be seen in FIGURE 12. The other end of inner screw section 34 has a yoke type end fitting 53, it being understood that any appropriate type of fitting or end connection may be used without detracting from the invention.

The operation of the embodiment in FIGURES 7 through 12 from the most retracted position as shown in FIGURE 7 to the most extended position as shown in FIGURE 11 occurs by the rotation of inner screw section 34 relative to screw nut 31. Since inner screw section 34 and outer screw section 33 are interlocked together, screw nut 31 will travel longitudinally along outer screw section 33 upon rotation of inner screw section 34 to move from the position shown in FIGURE 7 to the position shown in FIGURE 8. The interlocking between outer screw section 33 and inner screw section 34 is accomplished by the lock balls 40 located in passages 39 of outer screw section 33 being confined radially within the outer periphery of outer screw section 33 by slide ring 45. Slide ring 45 is held in a position to retain lock balls 40 within the outer circumferential limits of outer screw section 33 by springs 51 biasing slide ring 45 away from end cap 48, the limit of travel of slide ring 45 away from end cap 48 controlled by the interengagement of annular seats 46 and 47 on outer screw section 33 and slide ring 45 respectively.

As screw nut 31 advances longitudinally along outer screw section 33 to the position shown in FIGURE 8, the annular end of screw nut 31 engages the annular face of slide ring 45, and continued operation of the interlocked outer screw section 33 and inner screw section 34 will continue movement of screw nut 31 to move slide ring 45 from the position shown in FIGURE 8 to the position shown in FIGURE 9, the movement of screw nut 31 overcoming the bias resistance of springs 51. With the mechanism in position as shown in FIGURE 9, the ends of wall passages 39 in outer screw section 33 register with the arcuate cutouts 32a and 32b in screw nut 31 so that the lock balls 40 are free to move radially outward in passages 39, thereby locking screw nut 31 and outer screw section 33 together and concurrently unlocking outer screw section 33 and inner screw section 34. Since screw nut 31 cannot advance longitudinally any further along outer screw section 33 by virtue of the obstruction by slide ring 45 and end cap 48, and the fact that inner screw section 34 is unlocked from outer screw section 33 and accordingly is free to rotate relative thereto, the continued rotation of inner screw 34 will extend inner screw 34 from its telescoping position with outer screw section 33. This extension will back off the end of inner screw section 34 from the confronting abutment with piston or plug 41, plug 41 following the travel of the end of inner screw section 34 due to the biasing effect of spring 50 on end cap 48, the extent of travel continuing until the annular seat or wall formed between the small diameter portion 42 and large diameter portion 43 or plug 41 abuts the annular wall or seat 38 in outer screw section 33. This travel of plug 41 assures movement of the lock balls 40 in a radially outward direction through passages 39 to a position as shown in FIGURE 10 wherein the lock balls then register with the arcuate cutouts 32a and 32b in screw nut 31, thereby interlocking screw nut 31 and outer screw section 33 together. Thereafter, continued rotation of inner screw section 34 continues to withdraw the inner screw section 34 from outer screw section 33 to a position of maximum extension for the mechanism as shown in FIGURE 11.

Retraction of the mechanism is accomplished by rotation of inner screw section 34 in an opposite direction and the exact reversal of operation takes place whereupon inner screw section 34 will telescope into outer screw section 33, the end of inner screw section 34 bottoming on plug 41 forcing the plug 41 toward end cap 48 by overcoming the bias of spring 50 until plug 41 bottoms on seats 48a. Since inner screw section 34 is thereafter prevented from rotation relative to outer screw section 33, the continued rotation of inner screw section 34 in the same direction will start travel of screw nut 31 along outer screw section 33 from the position shown in FIGURE 8 to the position shown in FIGURE 7, this travel of screw nut 31 causing the lock balls 40 seated in cutout 32b to be forced radially inward in wall passage 39 by the action of the appropriate lug 32c, this movement of lock balls 40 being permitted by the fact that plug 41 having been moved by inner screw section 34 so as not to prevent such travel of lock balls 40. The continued longitudinal travel of screw nut 31 along outer screw section 33 from the position shown in FIGURE 9 to the position shown in FIGURE 8 will permit slide ring 45 to move away from end cap 48 due to the bias of springs 51, this movement of lock ring 45 serving to retain lock ball 40 radially within the outer circumference of outer screw section 33.

Once again it can be seen there is provided a positive sequencing arrangement for a telescoping screw actuator in that during the first portion of the depicted extension travel the inner and outer lock screw sections 34 and 33 respectively are locked against a relative rotation while the latter portion of the depicted extension travel has the outer screw section 33 and screw nut 31 positively interlocked against a relative rotation; this interlocking arrangement being the same on the retraction cycle in that lock ring 31 and outer screw section 33 are interlocked together against relative rotation until inner screw section 34 is telescoped within outer screw section 33 and thereafter outer screw section 33 and inner screw section 34 become positively interlocked against relative rotation while screw nut 31 is free to move longitudinally along outer screw section 33.

It is to be further understood that the pitch of the two screw sections need not be the same so as to accomplish through a constant r.p.m. drive, actuation of the screw nut through a fast travel for a given distance and a slower travel for a given distance, such being accomplished without a gear change or complex mechanisms. It is to be further realized that through the use of a combination of left hand and right hand threads in the same unit there can be accomplished combined extension and retraction cycles or portions during a single sequencing operation of rotation of the inner screw section or screw nut in one direction.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. An extendable-retractable rotary actuating mechanism comprising in combination; a pair of telescoping screw members capable of relative rotation therebetween during extension and retraction of the screw members, a screw nut capable of longitudinal travel along the outer screw member upon relative rotation therebetween, and lock means, said lock means interconnected with the telescoping screw members and adapted to lock the telescoping screw members against relative rotation during longitudinal travel of the screw nut along the outer screw member as well as lock the screw nut and outer screw member against relative rotation during extension and retraction of the telescoping members.

2. An extendable-retractable rotary actuating mechanism as claimed in claim 1 wherein said lock means is adapted for actuation by the relative movement of the telescoping screw members as well as the longitudinal travel of the screw nut relative to said outer screw member.

3. An extendable-retractable rotary actuating mechanism as claimed in claim 1 wherein said lock means comprises at least one lock ball located in a radial wall passage through the outer screw member, the diameter of said lock ball being greater than the length of said radial passage, said lock ball having a first position whereby all protuberance of the lock ball from the passage is from the radially inner end of the passage and a second position whereby all protuberance of the lock ball from the passage is from the radially outer end of the passage, said inner and outer screw members being so constructed that when the lock ball is in said first position said inner and outer screw members are prevented from relative rotation therebetween and when the lock ball is in said second position the inner and outer screw members are free for relative rotation therebetween, and said outer screw member and screw nut being so constructed that when the lock ball is in said second position said outer screw member and screw nut are prevented from relative rotation therebetween and when the lock ball is in said first position the outer screw member and screw nut are free for relative rotation therebetween.

4. An extendable-retractable rotary actuating mechanism as claimed in claim 3 including a control means having a first operative position for preventing movement of said lock ball from its first to second position and a second operative position for permitting movement of said lock ball from its first to second position, and means biasing said control means towards its first operative position, the movement of the control means from its first to second operative position by longitudinal travel of the screw nut along the outer screw member in abutment with the control means and against said biasing means.

5. An extendable-retractable rotary actuating mechanism as claimed in claim 4 including a second control means having a first operative position for preventing movement of said lock ball from its second to first position and a second operative position for permitting movement of said lock ball from its second to first position, and second means biasing said second control means toward its first operative position, the movement of the second control means from its first to second operative position occurring by telescoping travel of the inner screw member in the outer screw member in abutment with the second control means and against said second biasing means.

6. An extendable-retractable rotary actuating mechanism as claimed in claim 3 including a control means having a first operative position for preventing movement of said lock ball from its second to first position and a second operative position for permitting movement of said lock ball from its second to first position, and means biasing said control means toward its first operative position, the movement of the control means from its first to second operative position occurring by telescoping travel of the inner screw member in the outer screw member in abutment with the control means and against said biasing means.

7. An extendable-retractable rotary actuating mechanism having a pair of telescoping screw members capable of relative rotation therebetween during extension and retraction of the screw members, a screw nut capable of longitudinal travel along the outer screw member upon relative rotation therebetween, a base member fixedly located at one end of the outer screw member, a pair of openings through the outer screw member wall adjacent said base member, a radial slot located in the end of the inner screw member confronting said base member, a radial slot in the end of the screw nut confronting said base member, a first cam lock member pivotally connected to said base member and having a first position whereby a portion of the first cam lock member is located in the inner screw member radial slot to lock said inner and outer screw members against relative rotation therebetween and a second position whereby said portion of the first cam lock member is located in one of the outer screw member wall openings to permit relative rotation between the inner and outer screw members, and a second cam lock member pivotally connected to said base member and having a first position whereby a portion of the second cam lock member is located in the screw nut radial slot to lock said screw nut and outer screw member against relative rotation therebetween and a second position whereby said portion of the second cam lock member is located in the other of the outer screw member wall openings to permit relative rotation beween the screw nut member and outer screw member.

8. An extendable-retractable rotary actuating mechanism as claimed in claim 7 wherein said first cam lock member is adapted to be moved from its first position to its second position by the longitudinal travel of the screw nut along the outer screw member toward the base member.

9. An extendable-retractable rotary actuating mechanism as claimed in claim 7 wherein said second cam lock member is adapted to be moved from its first position to its second position by the telescoping retraction of the inner screw member relative to the outer screw member.

10. An extendable-retractable rotary actuating mechanism as claimed in claim 7 wherein said first cam lock member is adapted to be moved from its first position to its second position by the longitudinal travel of the screw nut along the outer screw member toward the base member, said second cam lock member is adapted to be moved from its first position to its second position by the telescoping retraction of the inner screw member relative to the outer screw member, and means biasing said first cam lock member toward its first position and said second cam lock member toward its first position.

11. An extendable-retractable rotary actuating mechanism comprising in combination: a pair of telescoping screw members capable of relative rotation therebetween during extension and retraction of the screw members, a screw nut capable of longitudinal travel along the outer screw member upon relative rotation therebetween, and a lock means interconnected with the telescoping screw members and having a first and second operable position, said lock means locking the telescoping screw members against relative rotation during longitudinal travel of the screw nut along the outer screw member when in the first position, and locking the screw nut and outer screw member against relative rotation in the second position.

12. An extendable-retractable rotary actuating mechanism as claimed in claim 11 wherein said lock means includes means for biasing said lock means toward both operative positions.

13. An extendable-retractable rotary actuating mechanism as claimed in claim 11 wherein said lock means has first and second operable positions and is adapted for actuation from the first operable position to the second operable position by the relative rotation of said pair of telescoping screw members, and actuated from the second position to the first position by the travel of the screw nut longitudinally of said outer screw member, each said movement from one position to another unlocking said telescoping screw members while concurrently locking said outer screw member and screw nut, and the vice versa movement of said lock means in the opposite direction unlocking said screw nut and outer screw member while concurrently locking both said telescoping screw members together to prevent relative rotation therebetween.

14. An extendable-retractable rotary actuating mechanism as claimed in claim 11 wherein the screw pitch between the inner and outer screw members is different than the screw pitch between the screw nut and outer screw member.

References Cited by the Examiner
UNITED STATES PATENTS 2,818,744  1/58  Moody _____ 74—424.8
3,053,104  9/62  Scavini _____ 74—424.8

DON A. WAITE, *Primary Examiner.*